(No Model.)
G. W. & E. E. GOOCH.
LAND MARKER.
No. 492,006. Patented Feb. 21, 1893.
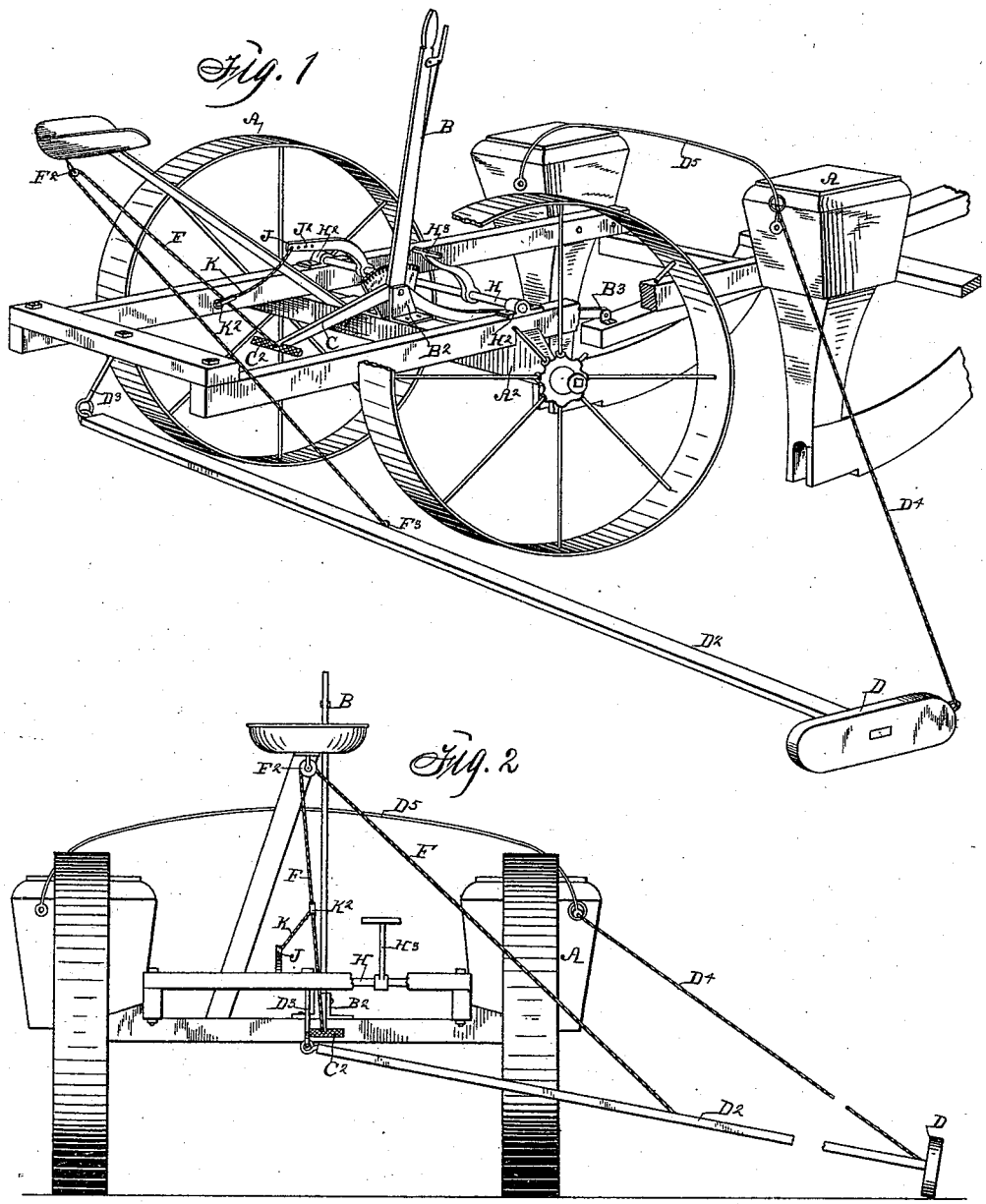
Witnesses:
W. J. Sankley
J. Ralph Orwig
Inventors: George W. Gooch,
Elmer E. Gooch,
By Thomas G. Orwig, Attorney

UNITED STATES PATENT OFFICE.

GEORGE W. GOOCH AND ELMER E. GOOCH, OF AVON, IOWA.

LAND-MARKER.

SPECIFICATION forming part of Letters Patent No. 492,006, dated February 21, 1893.

Application filed July 23, 1892. Serial No. 441,043. (No model.)

*To all whom it may concern:*

Be it known that we, GEORGE W. GOOCH and ELMER E. GOOCH, citizens of the United States of America, residing at Avon, in the county of Polk and State of Iowa, have invented a new and useful Marking Attachment for Corn-Planters, of which the following is a specification.

Heretofore markers have been attached to corn planters in such a manner as to be capable of being swung to either side thereof, and it has been customary for the driver or operator to dismount from the machine and place the marker on the opposite side when at the end of a field so that the marker will at all times maintain the same position relative to the line of advance.

Another frequent cause of difficulty has been found in the encountering of obstructions in the field in which case it has been necessary to raise the marker by hand.

Our object is to overcome these difficulties by providing a simple, strong and easily operated means whereby the marker may be partly elevated, together with the runners by either hand or foot power when turning. And also to provide means whereby the marker may be reversed from one side of the planter to the other or partially elevated by means of a treadle.

Our invention consists in the construction, arrangement and combination of certain mechanism relative to the corn planter and marker whereby the said marker may be readily elevated or reversed, as hereinafter more fully set forth, pointed out in our claims and illustrated in the accompanying drawings, in which:—

Figure 1 is a perspective view of a corn planter, having our improvement applied thereto and Fig. 2 is a rear elevation of the same.

Referring to the accompanying drawings, the reference letter A is used to designate the corn planter of which $A^2$ is the main axle.

B designates a lever fulcrumed to the support $B^2$ which in turn is fixed to the main axle $A^2$. This lever has its lower end $B^3$ pivoted to the rear end of the tongue and provides means whereby the runners may be adjusted.

C designates an arm fixed to and extended rearwardly from the lever B its outward end is formed in the shape of the treadle which is designated by the symbol $C^2$.

D designates a marker which is supported upon an arm $D^2$ which in turn has a pivotal connection at $D^3$ with the frame of the planter. It is maintained in its proper position relative to the planter by means of the rope $D^4$ which is fixed to its forward end and has a sliding connection with a guide $D^5$. This guide is composed of a metal rod fixed to the rear faces of the seed boxes and curved upwardly and rearwardly therefrom.

The treadle $C^2$ and the arm $D^2$ are connected by means of a rope F fixed to the said treadle extended upwardly through a pulley $F^2$ which is swiveled to the under side of the driver's seat and extended from thence downwardly to the loop $F^3$ which is located in the forward edge of the arm $D^2$. It will now be readily seen that the depression of the treadle $C^2$ or a forward movement of the lever B will elevate the marker D and also the runners of the machine at the same time.

H designates a rock shaft mounted in bearings $H^2$ which latter are mounted on the sides of the frame of the planter. $H^3$ designates a treadle fixed to this rock shaft H and extended in such proximity to the driver's seat as to be readily operated by a person seated thereupon.

J designates a lever which is also fixed to the rock shaft H and extended rearwardly therefrom and provided with a plurality of orifices $J^2$.

K designates a rope having an adjustable connection with the end of the lever J in the orifices $J^2$, and $K^2$ is a pulley fixed to the end of said rope and arranged to engage the rope F. This mechanism is so disposed relative to other operative parts of the machine as not to interfere with their operation, and is arranged to be readily detached therefrom, and is interchangeable with other corn planting machines. When it is desired to reverse the marker D the treadle $H^3$ is moved forwardly, thereby drawing the rope F forwardly and thereby elevating the marker D, and by reason of the rearward and upward inclination of the track $D^5$ upon which the rope $D^4$ travels, the marker D is allowed to pass the center of gravity and fall to the opposite side of the machine. And when it is desirable to elevate both the runners and the marker a manipulation of the lever B will produce the desired result.

Having thus described our improvement, what we claim as our invention, and desire to secure by Letters Patent of the United States, therefore, is—

1. In combination with a corn planter a marker having a pivotal connection with a rear central portion of its frame an arched track extended across the frame and secured to the rear of the seed containing boxes, a rope having its one end fixed to the marker and its remaining end having a sliding connection with the said track as set forth, a rock shaft mounted upon the machine frame in convenient proximity to the driver's or operator's seat, a lever secured to the rock shaft and extended rearwardly and upwardly therefrom, a rope secured to a stationary support extended upwardly through an elevated pulley and thence downwardly and attached to the arm of the marker, a rope secured to the end of the aforesaid lever and connected with the aforesaid rope, and means for manually operating the said rock shaft substantially as set forth and for the purposes stated.

2. In a corn planter the combination of the following elements, to wit: a marker attached thereto in such a manner as to be capable of being swung to either side thereof, a lever having a handle and treadle attached thereto, and fulcrumed to the axle as set forth, a segmental rack and detent attached to the lever for the purposes stated, means for elevating the runners of the machine by a manipulation of the said lever, a treadle extended rearwardly from the said lever, a rope attached to the treadle extended upwardly through an elevated support and thence downwardly and attached to the arm of the marker, a rock shaft mounted in the frame of the machine, a lever extended upwardly and rearwardly therefrom, a rope fixed to the said lever and having a pulley on its end which engages the upwardly extended portion of the aforesaid rope and the treadle mounted on the said rock shaft in convenient proximity to the driver's or operator's seat substantially in the manner set forth and for the purposes stated.

GEORGE W. GOOCH.
ELMER E. GOOCH.

Witnesses:
J. RALPH ORWIG,
THOMAS G. ORWIG.